UNITED STATES PATENT OFFICE.

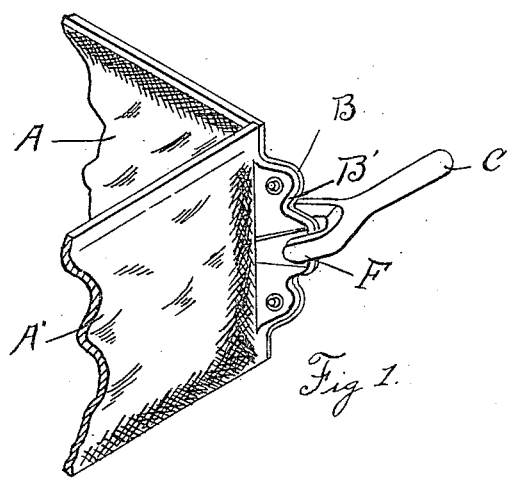
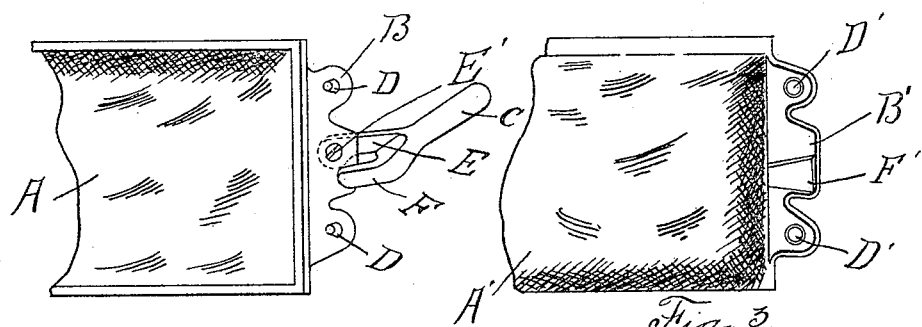
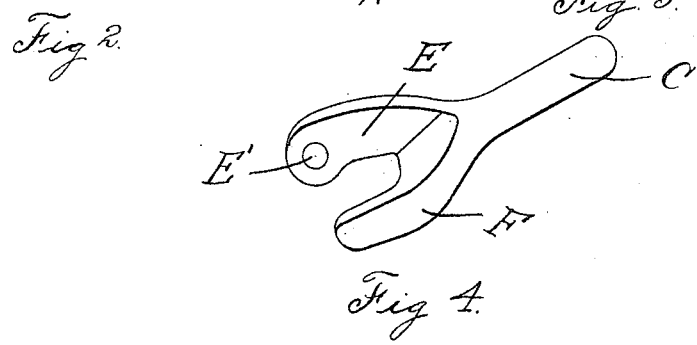

EUGENE D. ALLEN, OF DETROIT, MICHIGAN.

LOCKING AND SQUARING DEVICE.

No. 817,740.  Specification of Letters Patent.  Patented April 17, 1906.

Application filed August 17, 1905. Serial No. 274,581.

*To all whom it may concern:*

Be it known that I, EUGENE D. ALLEN, a citizen of the United States, residing at Detroit, in the county of Wayne and State of Michigan, have invented certain new and useful Improvements in Locking and Squaring Devices, of which the following is a specification.

This invention relates to improvements in locking and truing devices for concrete-block molds, flasks, and other molding-machines.

It has for its object to provide a means whereby separate plates of iron or other material which forms the different sides of molds or flasks may be easily locked at any of the corners required and at the same time brought into the alinement desired.

My invention is applicable to rectangular, hexagonal, circular, or any other shaped molds or flasks.

I attain these objects by the mechanism and construction hereinafter described and claimed and which are shown in the annexed drawings, illustrating my invention and constituting a part of this specification.

Figure 1 represents the intersecting corners of a mold or flask trued and secured by my locking device. Fig. 2 represents one door or side of the mold or flask, showing the truing flange or wing and lever-lock. Fig. 3 represents the complementary door or plate, showing the truing flange or wing and the holes which register with the lugs of the adjacent door. Fig. 4 is a view of the lever-locking device.

Similar letters refer to like parts throughout the different views.

A and A' represent adjacent plates which may be hinged or otherwise secured to other sides of the molding machine or flask by hinges of other means.

B and B' are flanges or wings projecting from the meeting edges of the plates A and A' at any desired angle. It is obvious that for rectangular molds requiring true square corners these wings on the adjacent plates would be forty-five degrees from the plane of said plates. If desired, however, one of the wings may be at a greater and the other at a lesser angle so long as the sum equals ninety degrees. For other than rectangular molds these flanges or wings would be placed at different angles. In this way any relative positions of the plates A and A' can be secured as desired. In some cases it may even be desired to secure adjacent mold-plates in the same plane. The lugs D project from the inner face of the wing B and register with the openings D' of the wing B'. These lugs are preferably made tapering, as are also the openings into which they fit, so that in drawing the two wings tightly together by use of the lever-lock the plates will be drawn to their proper alinement.

C is the exterior end of the lever-lock, which is divided at the interior end into the two prongs E and F. These prongs have their inner faces lying in planes parallel, or nearly so, to each other and separated a distance approximately that of the thickness of the two wings B and B'. The prong E is provided with the opening E', which is pivoted to the wing B and admits of an upward-and-downward motion. The outer surface of the wing B' may be provided with the inclined raised portion F' to form a bearing-surface for the cam-lever action of the prong F. Since the prong F enters at the bottom and is moved upward over the surface of F', it is obvious that said surface F' inclines outward at its upper edge. It is also obvious that the surface F' may be level and the desired cam action necessary to lock the wings together can be secured by an inclined or wedged surface upon the inner face of the prong F.

To operate my invention, the adjacent plates are brought together until the lugs D of the wing B are inserted in the openings D' of the flange B. The lever C' during this operation is held in a vertical position, so that the prong F is drawn back, permitting the flange B' to be placed against the flange B. The lever C is then pressed down, causing the prong F to move upward against the surface F'.

Modifications of the flanges or wings B and B' can be made, and any number of openings and prongs provided, as may be desired, without deviating from the intended scope of my invention. The lever C, with its interior divided ends, may also be modified, if desired, without departing from this invention, which intends to cover, broadly, a locking device of the nature described and the gist of which consists in providing the flanges or wings extending from the meeting edges of adjacent mold-plates, said flanges being fastened by a lever-lock substantially as described.

Having thus fully described my invention, what I claim, and desire to secure by Letters Patent, is—

1. In a locking and truing device for concrete-block molding flasks or machines, the combination of flanges projecting at angles from the meeting edges of mold-plates, of lugs upon one flange registering with openings in the adjacent flange, of a locking-lever divided at one end into two parts, one of which is pivoted to the flange on one of the plates while the other engages the flange of the adjacent plate, substantially as described.

2. In a device of the nature described, the combination with wings projecting at an angle from the meeting edges of mold-plates, of lugs on one of said wings registering with apertures in the adjacent wing, of a lever-lock consisting of a handle and two prongs, one of which is pivoted to one of said wings while the other engages the other wing, substantially as described.

3. A locking device of the nature described consisting of a lever separated at one end into two prongs, one of which is pivoted to the projecting wing of a mold-plate while the other engages the corresponding wing of a mold-plate, substantially as described.

4. A locking device for concrete-molds consisting of a handle divided at one end into two prongs separated and lying in parallel planes, one of said prongs pivoted to one door while the other admits of an outward and inward motion, engaging and disengaging the adjacent door, substantially as described.

In witness whereof I have signed my name to this specification in the presence of two subscribing witnesses.

EUGENE D. ALLEN.

Witnesses:
GEORGE DONALDSON,
DAVID N. HARPER.